May 12, 1970   J. G. HULETT   3,512,130

BINARY PERFORATION CODED CREDIT CARD AND SYSTEM

Filed Feb. 1, 1968                                    2 Sheets-Sheet 1

John G. Hulett
INVENTOR.

BY Lee R Larkin

ATTORNEY

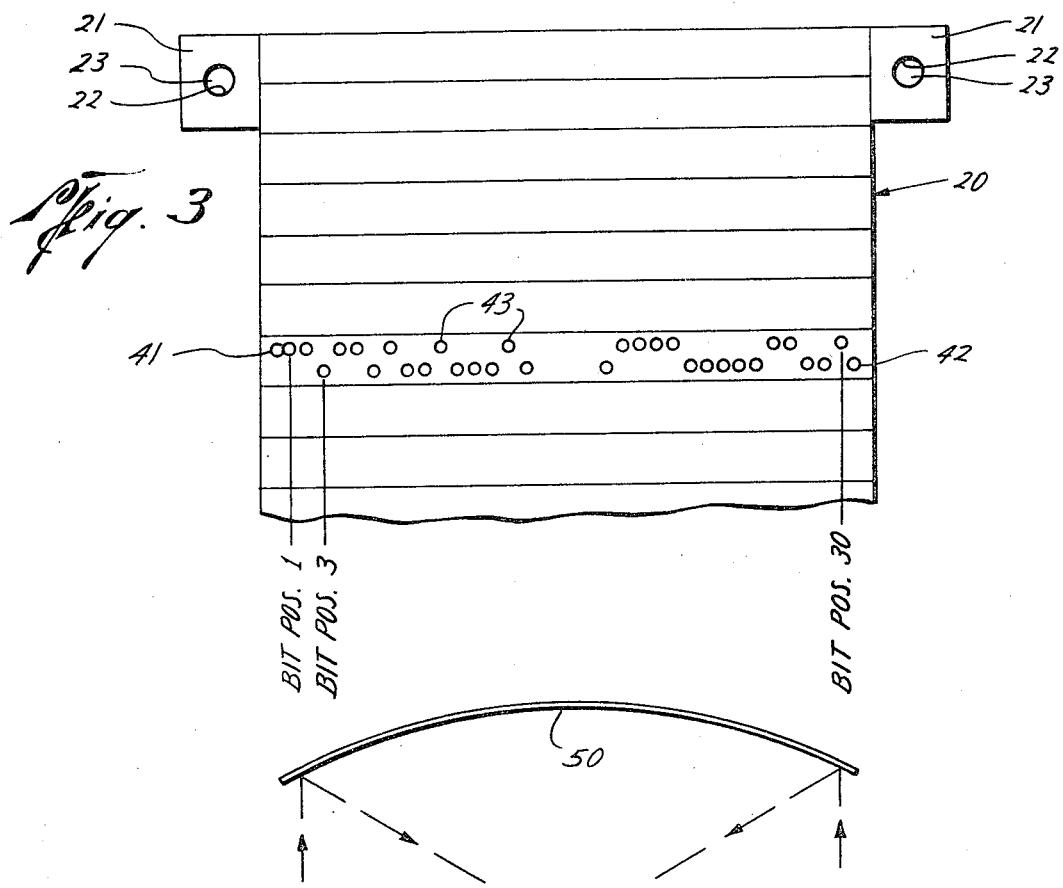
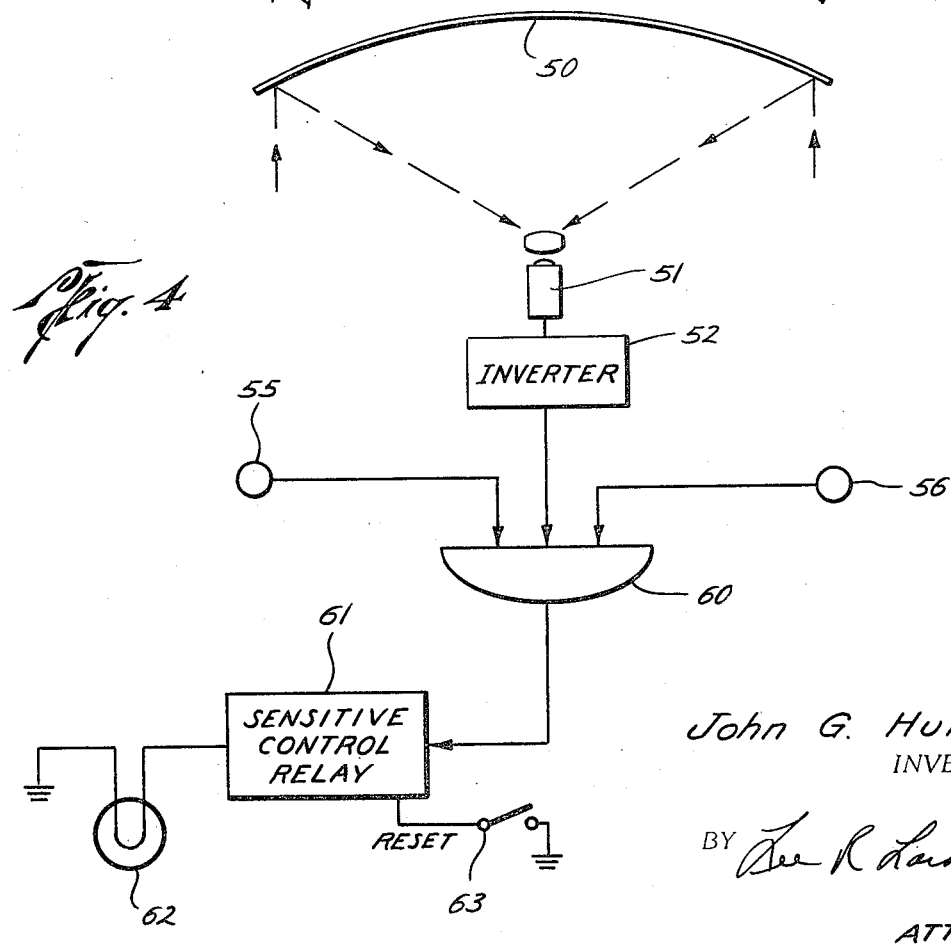

United States Patent Office 3,512,130
Patented May 12, 1970

3,512,130
BINARY PERFORATION CODED CREDIT CARD AND SYSTEM
John G. Hulett, Box 488, Rte. 1,
Pearland, Tex. 77581
Continuation-in-part of application Ser. No. 561,170,
June 28, 1966. This application Feb. 1, 1968, Ser.
No. 702,285
Int. Cl. H04q 1/00
U.S. Cl. 340—149     8 Claims

ABSTRACT OF THE DISCLOSURE

A credit card having an enclosed account number thereon for use in receiving credit from a plurality of different creditors. The invention includes a credit card system utilizing the novel credit card, and includes means for comparing the encoded account number on the card with a plurality of account numbers and signaling the presence of the encoded account number among the plurality of account numbers.

---

This application is a continuation-in-part of application Ser. No. 561,170 filed June 28, 1966, entitled Multiple Company Credit Card by the same inventor, now U.S. Pat. No. 3,376,661.

This invention relates to a novel credit card and system. More particularly, the invention relates to a credit card for use by a plurality of different creditors and employs the use of an encoded account number.

The system of this invention relates to a combination of a credit card having an encoded account number and a scanning means for comparing the encoded account number with a plurality of account numbers and signaling the presence of said encoded account number among said plurality of account numbers.

It is standard practice for companies that issue credit cards to their customers to publish and distribute periodically to their retail outlets a list of credit card account numbers which account numbers are not to be honored by reason of expiration, loss or stolen card, poor credit risk, and the like. Since the number of cards which fall in one or more of the above categories is substantial, the list is usually too long to make checking of each customer's credit card against the list practical. The result is that many millions of dollars are lost each year by the honoring of such credit cards by the oil industry alone.

It is therefore an object of this invention to provide an improved credit card and credit card system which is both inexpensive, rapid and easy of operation for checking each customer's credit card against the nonhonorable credit card account list and signaling the presence of the account number on the card among the list.

Briefly stated, the credit card of this invention is one which is for use in receiving credit from a plurality of different creditors and includes the combination of a card having the holder's identity displayed on the first portion thereof, a predetermined pattern of translucent micro-images displayed in a second portion of said card, with each of the micro-images identifying a different creditor, and each micro-image occupying a predetermined position in said pattern, whereby each of said creditor images may be readily located, and with the card having the card holder's account number encoded on a third portion thereof.

The credit card system of this invention includes the combination of a credit card having the encoded account number, and scanning means for comparing the encoded account number with a plurality of account numbers and signaling the presence of said encoded account number among said plurality of account numbers. The code system which is utilized is preferably a double entry binary code system which will be described hereinafter.

Reference to the drawings will further explain the invention wherein:

FIG. 3 is an enlarged and fragmentary top plan view of a portion of the replaceable account card containing nonhonorable or bad account numbers encoded therein.

FIG. 4 is a block diagram showing the focal point of a parabolic mirror which forms a part of the scanning apparatus, along with an electrical circuit providing the read-out means of the invention.

Figure 1:
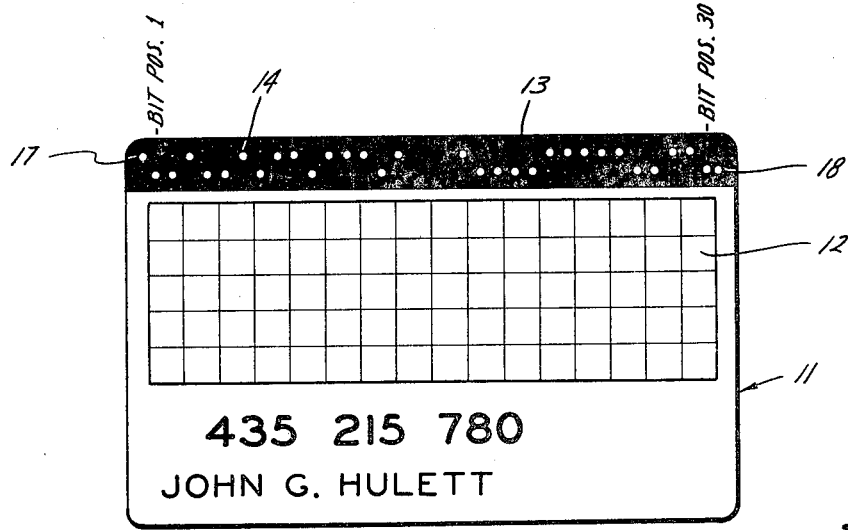
FIG. 1 is a top plan view of one embodiment of the credit card of this invention.

The credit card of this invention is generally shown in FIG. 1 and is of generally rectilinear shape and of a size to fit in a wallet or the like. The numeral 11 is used to generally designate the card and, it may be of the usual plastic material or of a plurality of sheets bonded together. Preferably, it will be comprised of relatively rigid upper and lower outer translucent layers with a thin layer bonded therebetween. This thin inner bonded layer may be of a photographic type material and have imprinted thereon the micro-images and the opaque portions hereinafter described. One portion of the card will have displayed thereon the card holder's identity, such as his name and account number, as shown, which may be embossed thereon for printing purposes.

Another portion of the card is in the form of grid 12 which will be generally translucent, with the grid defining a predetermined pattern of micro-images of different creditor companies, such that when light is passed therethrough, and the projected light magnified, the creditor's identity is readily visible. It is to be understood that in this system, each of the cards will have a similar grid system and each creditor's indicia will occupy the same unique location on each of the cards, such that the creditor's location on the card may be readily ascertained.

Another portion of the card is provided with the account holder's account number encoded thereon, which portion is generally designated by the numeral 13, and is preferably a generally opaque portion, with the code being in the form of a double entry binary code. Preferably, the code is in the form of two rows of bit positions in a binary code, with the one and zero values of the binary code designated by a generally circular translucent area, which areas are generally designated by the numeral 14.

The left end of the card is provided with an alignment means in the form of a translucent circle indicated by the numeral 17 and the right end of the card is similarly provided with another translucent circle designated by the numeral 18. While it is to be understood that circle 17 is in alignment with the top row of discrete areas or circles 14, and are similar thereto, it forms no part of the code. The same is true with respect to circle 18, i.e., while it is in line with the second row of discrete circles 14, it does not form a part of the code, but forms part of the alignment means, as will be explained hereinafter.

The double entry binary code is a system in which the least significant bit equals one. The card is broken up into two rows of bit positions, i.e., an upper row and a lower row. The upper row has a discrete area 14 for each bit position of the code which is a binary one. The second row of bit positions has a discrete area for each bit position of the code which is a binary zero. Card 11 is provided with thirty bit positions in each row which may be numbered from left to right for purposes of convenience. Using a code with thirty bit positions in each row, a total of 1,073,741,823 numbers can be recorded. The following table illustrates the code:

| (1) Bit positions | (2) Value | (3) Total No. of accts. which can be represented | (4) Code for Card No. 435-215-780 | |
|---|---|---|---|---|
| | | | Binary (a) zero row | Binary (b) one row |
| 1 | 1 | 1 | 0 | |
| 2 | 2 | 3 | 0 | |
| 3 | 4 | 7 | | 0 |
| 4 | 8 | 15 | 0 | |
| 5 | 16 | 31 | 0 | |
| 6 | 32 | 63 | | 0 |
| 7 | 64 | 127 | 0 | |
| 8 | 128 | 255 | | 0 |
| 9 | 256 | 511 | | 0 |
| 10 | 512 | 1,023 | 0 | |
| 11 | 1,024 | 2,047 | | 0 |
| 12 | 2,048 | 4,095 | | 0 |
| 13 | 4,096 | 8,191 | | 0 |
| 14 | 8,192 | 16,383 | 0 | |
| 15 | 16,384 | 32,767 | | 0 |
| 16 | 32,768 | 65,535 | | 0 |
| 17 | 65,536 | 131,071 | 0 | |
| 18 | 131,072 | 262,143 | 0 | |
| 19 | 262,144 | 524,287 | 0 | |
| 20 | 524,288 | 1,048,575 | 0 | |
| 21 | 1,048,576 | 2,097,151 | | 0 |
| 22 | 2,097,152 | 4,194,303 | | 0 |
| 23 | 4,194,304 | 8,388,607 | | 0 |
| 24 | 8,388,608 | 16,777,215 | | 0 |
| 25 | 16,777,216 | 33,554,431 | | 0 |
| 26 | 33,554,432 | 67,108,863 | 0 | |
| 27 | 67,108,864 | 134,217,727 | 0 | |
| 28 | 134,217,728 | 268,435,455 | | 0 |
| 29 | 268,435,456 | 536,870,911 | | 0 |
| 30 | 536,870,912 | 1,073,741,823 | 0 | |

As shown in the above table, Column 1 designates the bit positions. Column 2 designates the value for each bit position. Column 3 designates the total number of accounts which can be represented by the adjacent or corresponding number of bit positions. Column 4 is a typical code number such as 435,215,780. Column a corresponds with the bottom row of discrete circles 14 shown on card 11 in FIG. 1 and Column b corresponds with the top row of discrete circles 14 shown on card 11 in FIG. 1.

It is to be noted that each bit position must have a discrete circle 14 in card 11 either in the top or the bottom row, but not in both.

The invention, as stated earlier, includes scanning means or comparing the encoded account number on the credit card with a plurality of account numbers and signaling the presence of the encoded account number among the plurality of account numbers.

Preferably, the scanning means includes a medium having a plurality of account numbers encoded thereon, means for moving the medium relative to the card, and means for generating a signal when a number on the passing medium is the same as the account number encoded in the card, during the relative movement.

Figure 2:
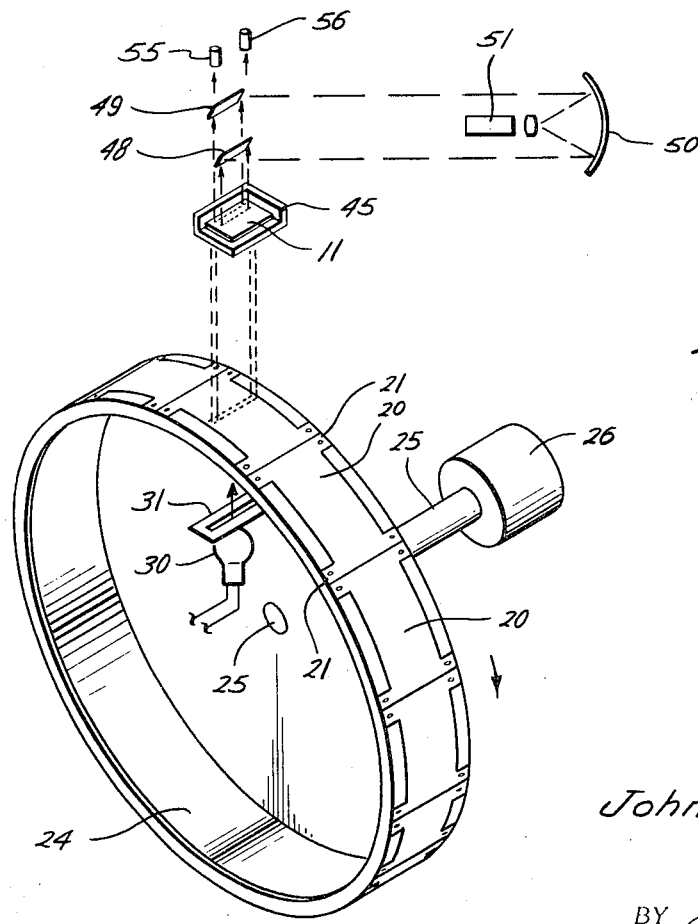
FIG. 2 is an isometric and partially exploded view of one embodiment of the scanning means of this invention.

The "bad" accounts may be encoded on an endless belt, or preferably, on a plurality of opaque account cards 20, such as those shown in FIGS. 2 and 3. Each of the cards 20 is provided with an ear 21 at each corner thereof, having a mounting hole 22 therein, which is arranged to fit over a peg 23 attached to a rotatable wheel 24. Wheel 24 is attached for rotation to shaft 25 which is arranged for rotation by motor 26. Wheel 24 has mounted thereinside a light source in the form of electrical light bulb 30 which is arranged for passage of light through a linear opening in mask 31 and arranged to project light upwardly through cards 20 during rotation of wheel 24, as shown.

Referring now to FIG. 3, the bad account numbers, i.e., the account numbers which are not to be honored, are encoded on cards 20 in reverse order to what they are on the credit cards 11.

For example, card 20 shown in FIG. 3, is shown having encoded therein, a double entry inverted binary code, which is the reciprocal of the code number shown on the card 11 in FIG. 1. In addition, on the left there is provided a translucent discrete area in the form of circle 41, which corresponds with circle 17 of card 11, and on the right there is provided a discrete translucent area in the form of circle 42, which corresponds with circle 18 on card 11.

In addition, there is provided a plurality of discrete translucent areas in the form of circles 43, with the upper row of discrete circles 43 corresponding with the lower row of circles 14 in FIG. 1. Similarly, the lower row of circles 43 in FIG. 3 correspond with the upper row of circles 14 in FIG. 1.

Thus, it will be seen that if card 11 is placed directly over card 20 shown in FIG. 3, and holes 41 and 42 respectively aligned with holes 17 and 18, there would be a complete masking of all the bit positions such that no light could be passed through both card 20 and card 11 to mirror 50.

Referring now to FIG. 2, the sensing or scanning means also includes a credit card holder 45 aligned above and spaced from wheel 24, such that when credit card 11 is placed therein, it is vertically aligned over one of the cards 20. Card holder 45 has spaced thereabove, mirrors 48 and 49, with mirror 48 being arranged to refract at 90° light passing through the bottom row of discrete circles 43 in a card 20 and circles 14 in a card 11, and with mirror 49 similarly refracting light passing through the top row of discrete circles 43 in card 20 and circles 14 in card 11. The light from mirrors 48 and 49 is directed to a spaced apart parabolic mirror 50, which then reflects the light to a common focal point, at which photo cell 51 is positioned for reception of any light passing through any or all bit positions in a code number.

Referring now to FIG. 4, photo cell 51 is arranged to produce an electrical output to inverter 52, which is arranged to have an electrical output only at times when it is receiving no input from photo cell 51.

Referring also now to FIGS. 2 and 3, when holes 41 and 42 in card 20 are aligned with holes 17 and 18 in card 11, light will similarly pass upwardly and strike photo cells 55 and 56, the outputs of which are directed to AND circuit 60, which is arranged to have an electric output to Sensitive Control Relay 61 only when there are three inputs to AND circuit 60. Relay 61 is arranged to activate warning light 62 upon receipt of an input thereto from AND circuit 60. Relay 61 is also provided with reset switch 63, which may be used to reset the circuit once warning light 62 has been activated. Warning light 62 therefore indicates the presence in a card 20 of an account number corresponding with the account number on a card 11.

It is to be further understood that each of the cards 11 in the system would have identical discrete areas or circles 17 and 18 and that each of the account numbers encoded in one of the account cards 20 would similarly have identical circles 41 and 42.

In operation, the bad account numbers or accounts which are not to be honored are encoded on a plurality of cards 20 in the manner shown and described with respect to FIG. 3. Cards 20 can be removed and replaced for updating purposes with new accounts removed or added thereto.

When it became necessary to check a particular card 11 to determine whether or not it is a bad account, the card 11 is placed in card holder 45, motor 26 actuated, and light bulb 30 turned on. During the rotation of wheel 24, light is projected upwardly through the cards 20 and 11, and against the mirrors 48 and 49.

Photo cells 55 and 56 are actuated each time an account number in a card 20 is aligned with the account number encoded in card 11. Because of the arrangement of the double entry binary code system described above, light passes through one or more of the discrete circles 43 in a card 20 and one or more of the discrete circles 14 in a card 11, unless the encoded account number on the card 11 is matched by the same number encoded on a card 20, in which event there is a complete match and a masking of any passage of light through discrete circles 14 and 43.

In other words, photo cell 51 will always have an output except in those instances when the account number on a card 11 matches an account number encoded on a card 20. When there is such a matching, photo cell 51 has no output, but inverter 52 does have an output, which, combined with the outputs from photo cells 55 and 56, actuates relay 61 and warning light 62, denoting the presence of a bad account amond the accounts encoded on card 20.

It will be further understood that mask 31 is arranged such that light passing therethrough can strike no more than two rows of the binary code at one time in cards 20 and 11.

The foregoing detecting procedure is repeated for each data position on a card 20 as they are continuously passed under a card 11 by operation of motor 26.

It is to be understood that cards 20 could be in the form of an endless belt made of paper and punched out, or of a photographic material wherein the rows of data are clear and dark spots. In either case, the account file is simply updated by replacement of the belt or the cards.

It will be noted that with respect to the bit positions forming the code, only one photo cell, i.e., photo cell 51, is required in order to perform the scanning operation. Photo cells 55 and 56 are used for alignment purposes, but other alignment means may be used. Hence, that is a simplicity of parts involved in the present system, thereby providing a very economical system for accomplishing the desired result.

For purposes of convenience, the discrete circles 43 in cards 20 and circles 14 in cards 11 may sometimes be referred to as the discrete areas of the binary code and those bit positions not translucent may be described as the nondiscrete bit positions.

It is to be understood that credit card holder 45 may also be provided with magnifying means and indexing means whereby the indicia in grid 12 may be read out, as is taught and claimed in applicant's aforesaid copending application.

What is claimed is:

1. A multiple company credit card for use in receiving credit from a plurality of different creditors, the combination comprising:
    a card having the card holder's identity displayed on a first portion thereof;
    a predetermined pattern of translucent micro-images displayed in a second portion of said card, each of said micro-images identifying a different creditor, and each micro-image occupying a predetermined position in said pattern, whereby each of said creditor images may be readily located;
    and said card having a two row double entry binary pattern representative of the holder's account number encoded on a third portion thereof.

2. A multiple company credit card for use in receiving credit from a plurality of different creditor companies, the combination comprising:
    a generally rectilinear translucent card having the holder's identity embossed on a first portion thereof;
    a grid system on a second portion of said card for defining a plurality of coordinate positions, each of said positions being assigned to a particular creditor for carrying a micro-image of said creditor's identity, whereby said creditor may be readily located;
    and said card having a two row double entry binary pattern representative of the holder's account number encoded on a third portion thereof.

3. In a credit card system, the combination comprising:
    a credit card having a two row double entry binary pattern encoded thereon representative of an account number;
    a medium having a plurality of two row double entry binary patterns encoded thereon representative of a plurality of account numbers;
    means for supporting said medium adjacent to said card and for moving said medium relative to said card;
    and means for generating a signal when the account number represented by said binary pattern on said card corresponds to one of said account numbers represented by said binary patterns on said medium during said relative movement.

4. The invention as claimed in claim 3 wherein:
    said binary patterns on said card and said medium are in the form of discrete translucent areas detectable from adjacent opaque portions of said card and said medium.

5. The invention as claimed in claim 4 wherein:
    the two rows of said double entry binary pattern of said medium are inverted relative to said two rows of said double entry binary pattern of said card.

6. The invention as claimed in claim 5 wherein said signal generating means includes:
    a light source arranged for projecting light through said discrete translucent pattern areas of said medium and said card;
    means for detecting the presence of light projected through said medium and said card;
    and means for generating a signal indicative of the absence of said projected light, which absence would occur when the account number pattern of said card corresponds to the inverted account number pattern of said medium.

7. The invention as claimed in claim 6 wherein:
    said projected light detecting means includes a parabolic mirror arranged to receive light projected through said card and said medium;
    and said signal generating means includes a photocell mounted at the focal point of said mirror and arranged to provide an electrical output in response to reception of any projected light.

8. The invention as claimed in claim 7 including:
    synchronization means for generating a second electrical output each time the account number encoded on said card is aligned with each account number in said medium during said relative movement;
    and circuit means for receiving said first and second electrical outputs and generating a signal when the account number encoded in said card passes over the identical number in said medium.

References Cited

UNITED STATES PATENTS

| | | |
|---|---|---|
| 2,482,242 | 9/1949 | Brustman. |
| 3,394,246 | 7/1968 | Goldman. |
| 1,945,321 | 1/1934 | Knee et al. _____ 40—2.2 |
| 3,239,815 | 3/1966 | Martens. |
| 3,045,364 | 7/1962 | Surber. |

HAROLD I. PITTS, Primary Examiner

U.S. Cl. X.R.

40—2.2; 250—219; 340—378